US008493941B2

(12) United States Patent
Nagaraj et al.

(10) Patent No.: US 8,493,941 B2
(45) Date of Patent: Jul. 23, 2013

(54) METHOD TO CONTROL THE EFFECTS OF OUT-OF-CELL INTERFERENCE IN A WIRELESS CELLULAR SYSTEM USING OVER-THE-AIR FEEDBACK CONTROL

(75) Inventors: Shirish Nagaraj, Cedar Knolls, NJ (US); Subramanian Vasudevan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 422 days.

(21) Appl. No.: 11/409,161

(22) Filed: Apr. 21, 2006

(65) Prior Publication Data
US 2007/0248051 A1    Oct. 25, 2007

(51) Int. Cl.
*H04B 1/707*    (2006.01)

(52) U.S. Cl.
USPC .......... 370/335; 455/13.4; 455/571; 455/522; 370/318; 370/317

(58) Field of Classification Search
USPC ........................................................ 370/335
See application file for complete search history.

(56) References Cited

U.S. PATENT DOCUMENTS

| 5,345,467 | A | * | 9/1994 | Lomp et al. ..................... 370/331 |
| 5,535,238 | A | * | 7/1996 | Schilling et al. ............... 375/142 |
| 5,584,057 | A | * | 12/1996 | Dent .............................. 455/101 |
| 5,781,583 | A | * | 7/1998 | Bruckert et al. ............... 375/146 |
| 5,918,184 | A | * | 6/1999 | Wang ............................. 455/561 |
| 5,951,709 | A | * | 9/1999 | Tanaka .......................... 714/755 |
| 6,078,809 | A | * | 6/2000 | Proctor .......................... 455/416 |
| 6,215,762 | B1 | * | 4/2001 | Dent .............................. 370/208 |
| 6,289,217 | B1 | * | 9/2001 | Hamalainen et al. ......... 455/425 |
| 6,434,367 | B1 | * | 8/2002 | Kumar et al. ................... 455/70 |
| 6,463,294 | B1 | * | 10/2002 | Holma et al. ................. 455/513 |
| 6,507,572 | B1 | * | 1/2003 | Kumar et al. ................. 370/335 |
| 6,542,756 | B1 | * | 4/2003 | Kim ............................... 455/522 |
| 6,697,629 | B1 | * | 2/2004 | Grilli et al. .................. 455/456.1 |
| 6,757,270 | B1 | * | 6/2004 | Kumar et al. ................. 370/342 |
| 6,757,532 | B1 | * | 6/2004 | Haartsen .................... 455/414.1 |
| 6,799,045 | B1 | * | 9/2004 | Brouwer ....................... 455/453 |
| 6,839,336 | B2 | * | 1/2005 | Tiedemann et al. .......... 370/335 |
| 6,904,286 | B1 | * | 6/2005 | Dantu ......................... 455/452.2 |
| 6,934,264 | B2 | * | 8/2005 | Jou .............................. 370/278 |
| 6,996,069 | B2 | * | 2/2006 | Willenegger ................. 370/252 |
| 7,170,876 | B2 | * | 1/2007 | Wei et al. ..................... 370/335 |
| 7,336,953 | B2 | * | 2/2008 | Kim et al. .................... 455/438 |
| 7,373,161 | B2 | * | 5/2008 | Anderson ..................... 455/522 |
| 7,408,913 | B2 | * | 8/2008 | Khan ............................ 370/345 |
| 2003/0050084 | A1 | * | 3/2003 | Damnjanovic et al. ....... 455/522 |

(Continued)

FOREIGN PATENT DOCUMENTS

| GB | 2 383 503 A | 6/2003 |
| WO | WO02056505 A1 | 7/2002 |
| WO | PCT/US2007/009328 | 10/2007 |

*Primary Examiner* — Steven Lim
*Assistant Examiner* — Diego Herrera (57) ABSTRACT

A mobile terminal is controlled via over-the-air feedback so as to enable its data transmissions to be independently and successfully decoded at each of the base stations in its active set absent a transmit power limitation or data retransmission limit. Using the decoded data, the channel is re-estimated and the waveform received from the mobile terminal is reconstructed and subtracted from the total interference at each base station in the active set where decoding has been successful. As a result, transmissions from other mobile terminals, which have yet to be successfully decoded at such a base station, will experience a higher signal-to-noise ratio and thus an increased likelihood of being successfully decoded.

10 Claims, 5 Drawing Sheets

U.S. PATENT DOCUMENTS

| | | |
|---|---|---|
| 2003/0112778 A1* | 6/2003 | Lundby .......................... 370/335 |
| 2003/0161285 A1* | 8/2003 | Tiedemann et al. ........... 370/332 |
| 2004/0137930 A1* | 7/2004 | Kim et al. ...................... 455/517 |
| 2004/0192208 A1 | 9/2004 | Kong et al. .................... 455/63.1 |
| 2005/0009551 A1* | 1/2005 | Tsai et al. ...................... 455/522 |
| 2007/0183451 A1* | 8/2007 | Lohr et al. ...................... 370/473 |
| 2009/0238148 A1* | 9/2009 | Englund et al. ................ 370/335 |

* cited by examiner

METHOD TO CONTROL THE EFFECTS OF OUT-OF-CELL INTERFERENCE IN A WIRELESS CELLULAR SYSTEM USING OVER-THE-AIR FEEDBACK CONTROL

TECHNICAL FIELD

This invention relates to wireless communications.

BACKGROUND OF THE INVENTION

Figure 1:
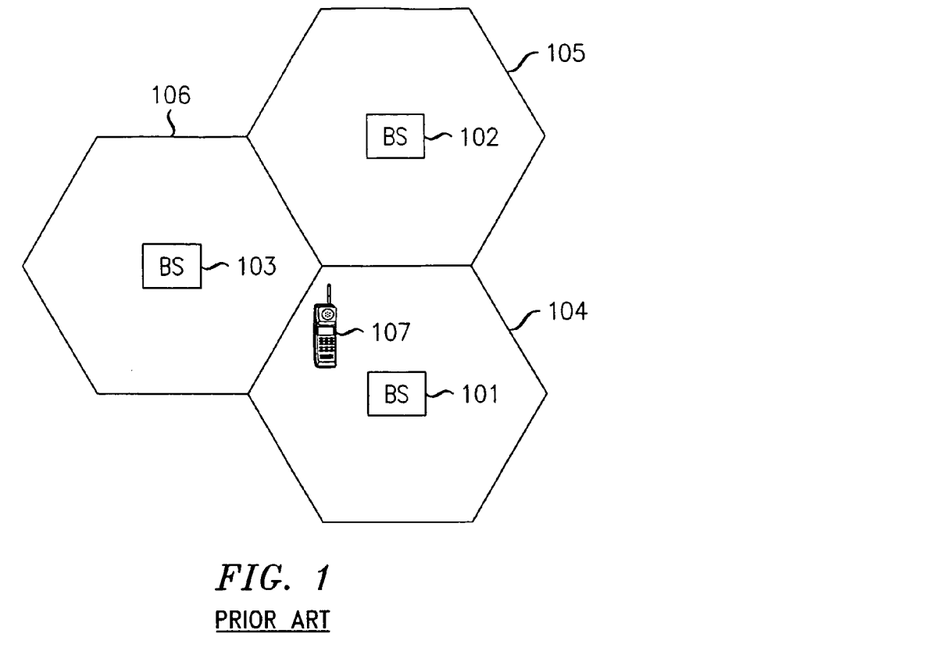
FIG. 1 shows a prior art arrangement of a mobile terminal and the serving base station and non-serving base stations in its active set.

In a wireless system, mobile terminals transmit and receive data over bidirectional wireless links from one or more base stations. The mobile terminal-transmit direction is known as the uplink and the mobile terminal-receive direction is known as the downlink. The set of base stations with which a mobile terminal is communicating is known as the active set of base stations for that mobile terminal, or that mobile terminal's active set. During normal conditions when a mobile terminal is within a base station's coverage area, the active set for that mobile terminal would generally be a single base station so that the active set includes only that one base station, which is that mobile terminal's serving station. When a mobile terminal, however, is within the range of multiple base stations and as such is in a handoff state, the active set includes the multiple base stations, which are each monitoring the signal from that mobile terminal and decoding it when able to do so. Only one of the base stations, however, is the serving base station for that mobile terminal and the other base stations are non-serving base stations. FIG. 1 shows three base stations 101, 102 and 103 and their respective cell coverage areas 104, 105 and 106. Mobile terminal 107 is shown within the coverage area 104 of base station 101, which is its serving base station. Non-serving base stations 102 and 103, however, in addition to serving base station 101 constitute the active set for mobile terminal 107.

In a data system, on the downlink, the mobile terminal 107 receives data from only one base station but has the option of reselecting the serving base station in order to receive data from any other base station in its active set depending on from which base station the mobile terminal receives a signal with the highest signal-to-noise ratio. On the uplink, the serving and the non-serving base stations each attempts to demodulate and decode transmissions from the mobile terminal.

The capacity of a wireless system refers either to the number of mobile terminals that can simultaneously transmit or receive data, or the aggregate date rate of these mobile terminals, either expressed in mobile terminals/sector, erlangs/sector or data throughput/sector. The uplink capacity of the system can be different from its downlink capacity. For symmetric services, such as voice, (i.e., required throughput/data rate for a mobile terminal on the uplink is equal to that on the downlink), the overall system capacity is limited by the lower of uplink and downlink capacity. In current wireless systems specified by standards such as CDMA2000 1x, EV-DO Rev 0 and Rev A, HSDPA/EDCH, and WiMAX, the uplink has a substantially lower capacity than the downlink. This imbalance needs to be remedied for full use of downlink capacity and to maximize the number of mobile terminals than can operate symmetric services on the system.

Figure 2:
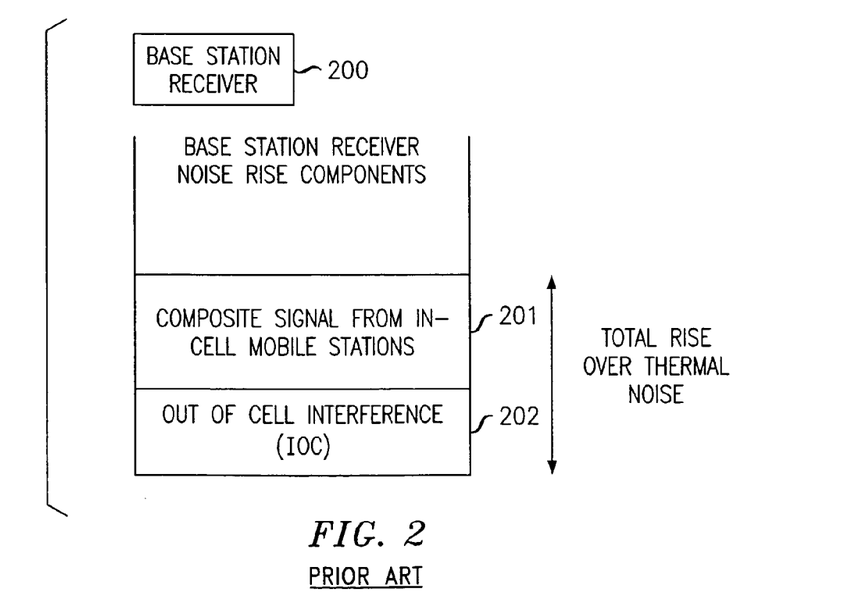
FIG. 2 illustrates base station noise rise components.

In wireless systems that are based on direct spread or multi-carrier (optionally with preceding) CDMA, a plurality of mobile terminals within a sector (and across sectors) re-use a spreading sequence or a set of frequency tones to communicate with their respective active sets, while being differentiated by mobile terminal-specific codes. A mechanism for increasing uplink sector capacity is to perform successive interference cancellation on these transmissions at the base station transceiver. FIG. 2 illustrates base station noise rise components. As shown, at a base station receiver 200, the total rise over thermal noise in a sector consists of the composite signal 201 from the mobile terminals within that sector for which that base station is the serving base station, and the out-of-cell interference 202 caused by mobile terminals transmitting in adjacent sectors. The latter includes interference from those mobile terminals in the adjacent sectors for which base station receiver 200 is within these mobile terminals' active set but for which base station 200 is non-serving, plus the interference caused by other transmitting mobile terminals in other sectors that do not include base station 200 within each such mobile terminal's active set.

Figure 3:
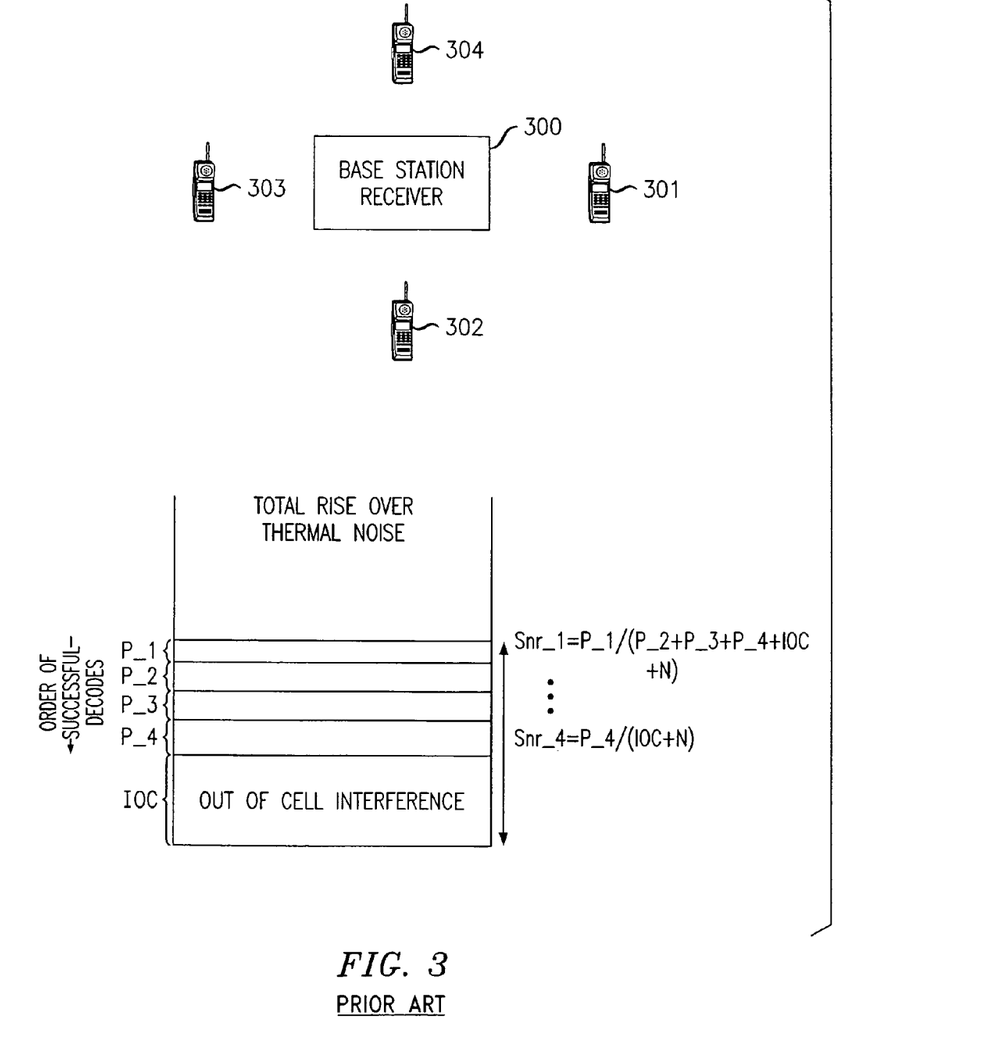
FIG. 3 shows a prior art successive interference cancellation scheme at an exemplary base station receiver that is the serving base station for four mobile terminals within a sector of that base station receiver.

An illustrative method of interference cancellation is disclosed in co-pending patent application Ser. No. 10/401,594 filed Mar. 31, 2003, and published as U.S. Patent Application Publication No. US2004/0192208 A1 on Sep. 30, 2004. Using such an interference cancellation method, if the decoding of any mobile terminal is successful, its signal is reconstructed and subtracted from the composite received signal at the base station. FIG. 3 shows a successive interference cancellation scheme at an exemplary base station receiver 300 that is the serving base station for four mobile terminals 301, 302, 303 and 304 within a sector of that base station receiver 300. The received power at base station receiver 300 from mobile terminals 301, 302, 303, and 304 is respectively $P\_1$, $P\_2$, $P\_3$, and $P\_4$. In addition, base station receiver 300 receives a composite signal power as the result of out-of-cell interference (IOC) caused by transmissions from mobile terminals out of the sector. When a particular transmission from a mobile terminal from within the sector is successfully decoded by the base station receiver, the transmission is reconstructed and subtracted from the composite signal at the base station, after which another received signal is demodulated, decoded, reconstructed and subtracted from the remaining composite signal. This process is repeated for each of the remaining signals. Advantageously, the signals from the mobile terminals that are decoded later in the demodulation and decoding process do not "see" the interference from transmissions from the mobile terminals that were decoded earlier in the sequence. FIG. 3 shows a successive calculation of the signal-to-noise ratios ($Snr\_1$-$Snr\_4$) of the four mobile terminals 301-304, respectively. Starting with mobile terminal 301, $Snr\_1$ is calculated as $P_1 1/(P\_2+P\_3+P\_4+IOC+N)$, where N is the measurable thermal noise. The contribution from each is successively subtracted off from the received composite signal at the base station receiver, so that, for the last mobile terminal 304, $Snr\_4$ is calculated as $P\_4/(IOC+N)$. Since the mobile terminals that are decoded later see a higher signal-to-noise ratio, they are capable of supporting either a higher rate of transmission and/or increased reliability.

In the above-described scenario, it is not possible for the base station receiver to successfully decode the transmissions of all the mobile terminals that have this base station sector in their active set. As a result, most of the out-of-cell interference received by a base station receiver cannot be deducted. Thus, as noted above, the signal-to-noise ratio for station 304 is still limited by this out-of-cell interference IOC.

Typically, the power control rule followed by mobile terminals is to either (i) follow power control commands from the serving sector in its active set, or (ii) follow a rule known as the or-of-the-downs, whereby the mobile terminal lowers its power if any of the base stations in the active set instructs it to do so via a down power control command. While an or-of-the-downs power control ensures successful reception of the mobile terminal's transmission at at least one base station (presumably the one with the best uplink connection from the mobile terminal), it also ensures that the mobile terminal's transmission is not received with adequate signal-to-noise ratio to be successfully decodable at all of the base stations in the active set. Thus, this undecodable interference limits the capacity gain from a system employing successive interference cancellation. Even as mobile terminals within a sector transmit with ever increasing powers, in order to increase their signal-to-noise ratios at the base station receiver (and hence achieve higher data rates), their interference to adjacent sectors grows proportionately, thereby limiting the rates that can be achieved by mobile terminals in those sectors. In turn, the interference from the mobile terminals in adjacent sectors marginalizes the gains for the mobile terminals with the sector under consideration that increased their power in the first place.

A methodology is thus desired that enables a base station receiver to reconstruct and subtract the out-of-cell interference from the composite received signal so that the signal-to-noise ratio can be improved for all in-sector mobile terminals.

SUMMARY OF THE INVENTION

In an embodiment of the present invention, a mobile terminal is controlled via over-the-air feedback so as to enable its data transmissions to be independently and successfully decoded at each of the base stations in its active set absent a transmit power limitation or data retransmission limit. Using the decoded data, the channel (i.e., the multipath profile in the time domain or frequency domain channel response) is re-estimated and the waveform received from the mobile terminal is reconstructed and subtracted from the total interference at each base station in the active set where decoding has been successful. As a result, transmissions from other mobile terminals, which have yet to be successfully decoded at such a base station, will experience a higher signal-to-noise ratio and thus an increased likelihood of being successfully decoded.

The methodology can be used in any system where out-of-cell interference limits the signal-to-noise ratio for one or more in-cell mobile terminals such as the system .described above that uses successive interference cancellation, or an OFDMA system that allows only one in-cell transmission over a given set of frequency tones.

In various embodiments, the transmission of data by a mobile terminal is controlled in response to over-the-air feedback from the base stations in its active set so as to ensure that this data can be successfully decoded by these base stations absent power or retransmission limitations. In a first embodiment of the present invention, while in a handoff (i.e., the active set of the mobile terminal is greater than one), the transmit power of a mobile terminal is controlled by over-the-air power control commands received from all the base stations in its active set. Rather than employing an or-of-the-downs power control rule whereby the mobile terminal lowers its transmit power if any base station in its active set instructs it to do so via a down power control command, a mobile terminal in handoff follows an or-of-the-ups rule whereby it may increase its transmit power if any base station in its active state tells it to go up, thereby ensuring decodability of its transmissions at all the base stations in its active set. If, however, the mobile terminal receives a power-up command from a base station in its active set and it is already transmitting at its maximum allowed power, or if its transmit power is greater by a predetermined amount than the power at which the serving base station wants the mobile terminal to be transmitting, then the mobile terminal either reverts to an or-of-the-downs power control rule, or only follows power control commands that are received from the serving base station.

In a second embodiment, the transmit power of a mobile terminal in handoff is controlled by over-the-air positive and negative acknowledgments (ACKS and NACKS, respectively) received from the base stations in the mobile terminal's active set in response to a transmission of a data packet by the mobile terminal. The mobile terminal monitors the ACK/NACK acknowledgments from the base stations in its active set while tracking the transmit power that is required for a successful reception of the packet at the serving base station. If at the packet's retransmission limit, the mobile terminal in handoff receives a NACK from any base station in its active set (an or-of-the-NACKS rule), it may increase its transmit power. If, however, the mobile terminal receives a NACK from one of the base stations in its active set and it is already transmitting at its maximum allowed power, or if its transmit power is greater by a predetermined amount than the power at which the serving base station wants the mobile terminal to be transmitting, then fro subsequent packet transmissions the mobile terminal either reverts to an or-of-the-ACKS power control rule (i.e., it increases its transmit power only if doesn't receive an ACK from at least one base station in its active set), or only follows ACK/NACK feedback commands that are received from the serving base station for its power control.

An or-of-the-NACKs retransmission rule is used in a third embodiment. In this embodiment the mobile terminal in handoff monitors acknowledgments from the base stations in its active set. If in response to the transmission of a data packet, the mobile terminal receives a NACK from any of the base stations in its active set, it retransmits that data packet unless the retransmission limit for that packet has been reached. If such limit has been reached, for the next data packet the mobile terminal follows an or-of-the ACKS rule wherein the mobile terminal does not retransmit the packet if it receives an ACK from any base station in its active set, or alternatively only follows acknowledgments received from the serving base station.

BRIEF DESCRIPTION OF THE DRAWING

The present invention will be better understood from reading the following description of non-limiting embodiments, with reference to the attached drawings, wherein below.

DETAILED DESCRIPTION

Figure 4:
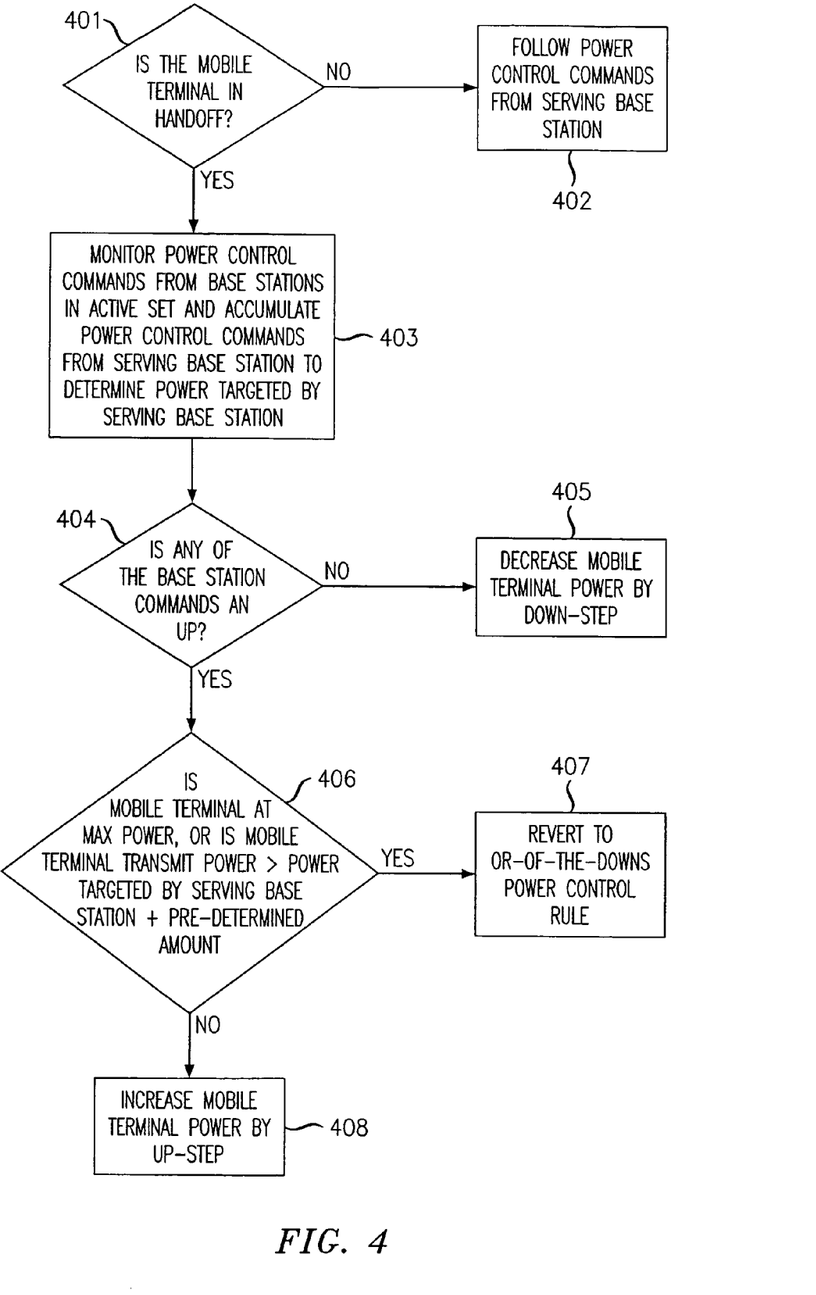
FIG. 4 shows the steps at a mobile terminal in accordance with a first embodiment that employs an or-of-the ups rule in controlling its transmit power during handoff.

With reference to the flowchart in FIG. 4, the methodology employed at a mobile terminal operating in accordance with an or-of-the-ups rule is shown. At step 401, a determination is made whether the mobile terminal is in handoff (i.e., whether or not the active set is greater than one). In addition, but not shown, an optional additional determination may be made of whether the mobile terminal's average path losses to the base stations in its active set differ from each other by more than a predetermined amount. If it is not in handoff, at step 402, the mobile terminal follows power control commands received from its one serving base station. If it is in handoff (and if the optional determination of average path losses indicates that such average path losses differ from each other by less then the predetermined amount), then, at step 403, the mobile terminal monitors power control commands from the base stations in its active set and accumulates power control commands (the sequence of +1s and −1s) from the serving base station to determine the power targeted by the base station. Specifically, by accumulating these +1s and −1s, the power level at which the serving base station would like the mobile terminal to operate can be determined. At step 404, a determination is made whether any of the power commands received by any of the base stations in the active set is an "up" (an or-of-the ups rule). If not, indicating that the received power level at all of that base stations in the active set is at or above the target (and in turn that the transmission is likely to have been successful at all of the base stations), then, at step 405, the mobile terminal decreases its transmit power by a predetermined down-step. If, at step 404, any of the power commands received from any of the base stations in the active set is an "up" (indicating that transmission in unlikely to have been successful at the base station(s) from which the up is received), then the mobile terminal transmit power may be increased. Before increasing its transmit power, however, a determination is made, at step 406, whether the mobile terminal is already at its maximum transmit power, or whether the mobile terminal transmit power exceeds the power targeted by the serving base station by more than a predetermined amount. If either is the case, then, at step 407, the mobile terminal reverts to an or-of-the-downs power control rule (i.e., the mobile terminal lowers its power if any base station in the active set instructs it to do so). Alternatively, but not shown, the mobile terminal reverts to following power control from only the serving base station. If, at step 406, the mobile terminal is not at its maximum transmit power and does not exceed the power targeted by the serving base station by the predetermined amount, then, at step 408, the mobile terminal increases its transmit power by a predetermined up-step.

Figure 5:
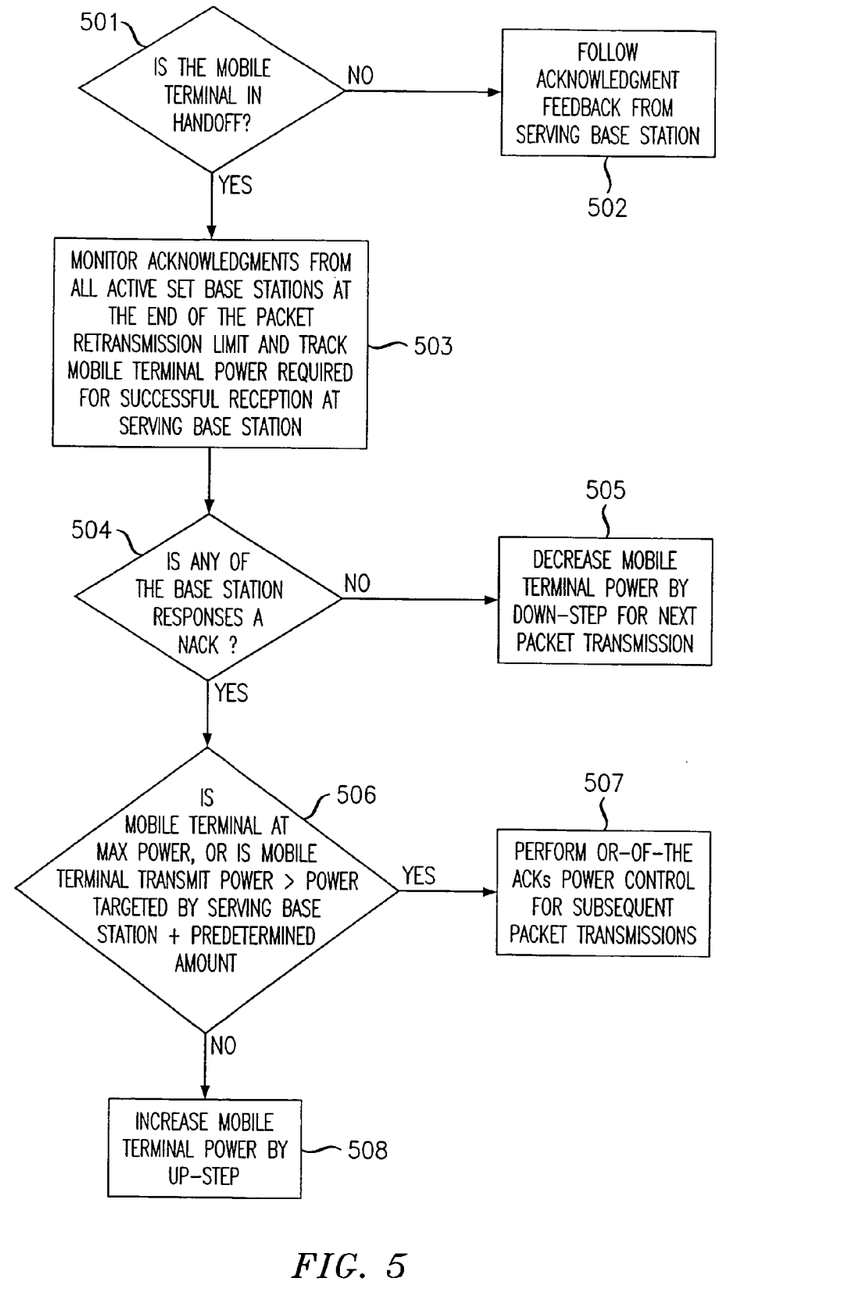
FIG. 5 shows the steps at a mobile terminal in accordance with a second embodiment that employs an or-of-the-NACKS rule in controlling its transmit power during handoff.

With reference to the flowchart in FIG. 5, the methodology employed at a mobile terminal operating in accordance with an or-of-the-NACKS rule is shown. At step 501, a determination is made whether the mobile terminal is in handoff. As in the first embodiment, an optional addition determination may be made of whether the mobile terminal's average path losses to the base stations in its active set differ from each other by more than a predetermined amount. If it is not in handoff, at step 502, the mobile terminal follows acknowledgment feedback (ACKS/NACKS) from its one serving base station. If it is in handoff, (and if the optional determination of average path losses indicates that such average path losses differ from each other by less then the predetermined amount), then, at step 503, at the end of the packet transmission limit (i.e., after the mobile terminal has transmitted a data packet its maximum allowed number of times), the mobile terminal monitors acknowledgments from all base stations in the active set. In addition, the transmit power of the mobile terminal that is required for a successful reception at the serving base station is tracked. At step 504, a determination is made whether at the end of the packet transmission limit any of the acknowledgments is a NACK, indicating an unsuccessful reception (an or-of-the-NACKs determination) at the base station(s) from which the NACK(s) is received. It should be noted that in certain systems a NACK is indicated by base station silence, i.e., the absence of the base station transmitting an ACK. If none of the responses is a NACK, then the packet has been successfully received at each of the base stations in the active set and, at step 505, the mobile terminal power is decreased by a down-step for a next packet transmission. If, however, at step 504, any of the base station responses is a NACK, then the mobile terminal power may be increased. Before increasing its transmit power, however, a determination is made, at step 506, whether the mobile terminal is already at its maximum transmit power, or whether the mobile terminal transmit power exceeds the power targeted by the serving base by more than a predetermined amount. If either is the case, then, at step 507, the mobile terminal reverts to an or-of-the-ACKS power control rule for subsequent packet transmissions (i.e., the mobile terminal increases its transmit power only if doesn't receive an ACK from at least one base station in its active set). Alternatively, but not shown, the mobile terminal reverts to following power control based on the ACK/NACK received from only the serving base station. If, at step 506, the mobile terminal is not at its maximum transmit power and does not exceed the power targeted by the serving base station by the predetermined amount, then, at step 508, the mobile terminal increases its transmit power by a predetermined up-step.

Figure 6:
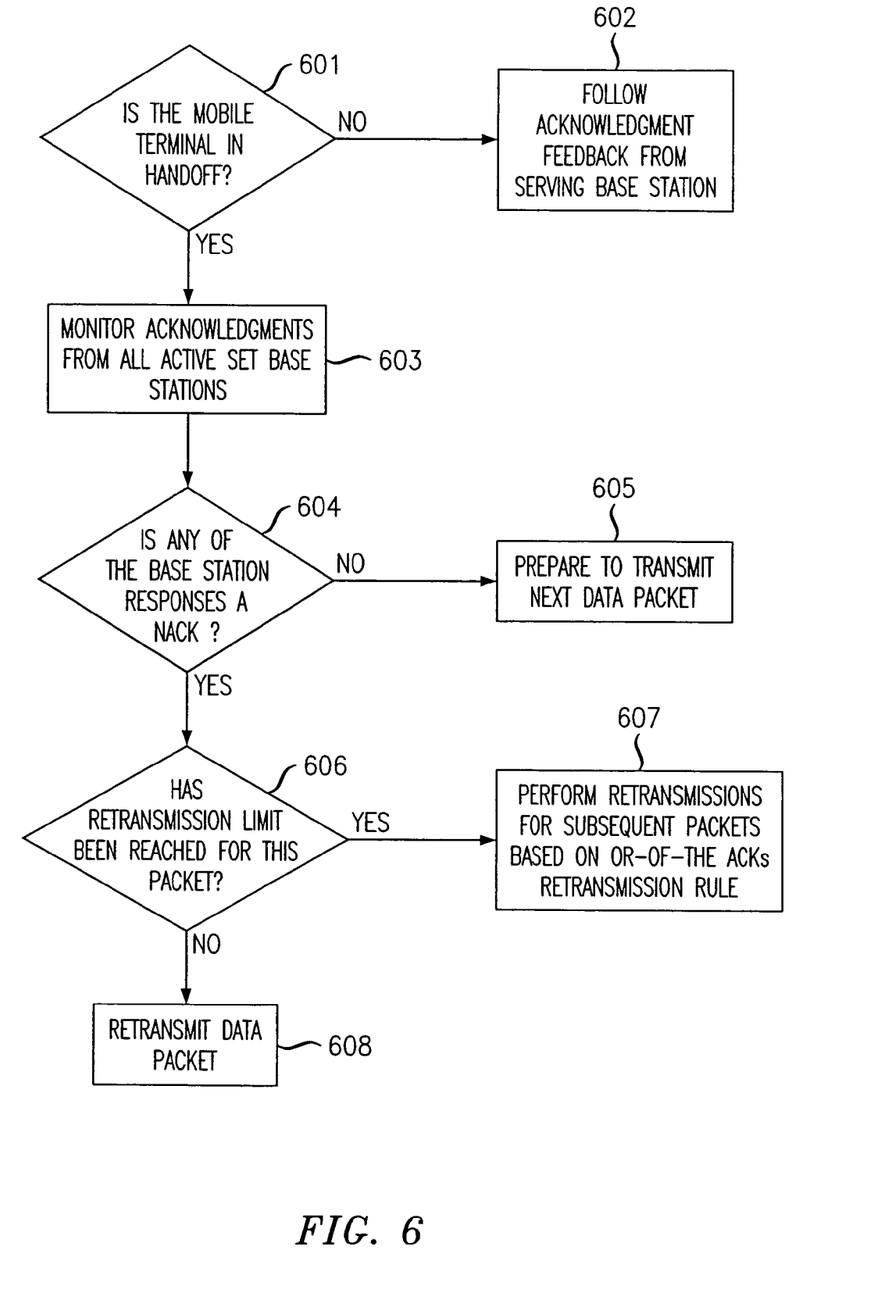
FIG. 6 shows the steps at a mobile terminal in accordance with a third embodiment that employs an or-of-the-NACKS rule in controlling its retransmissions of data during handoff.

With reference to the flowchart in FIG. 6, another methodology employed at a mobile terminal operating in accordance with an or-of-the-NACKS rule is shown. At step 601, a determination is made whether the mobile is in handoff. As in the previously discussed embodiments, in addition, but not shown, an additional optional determination may be made of whether the mobile terminal's average path losses to the base stations in its active set differ from each other by more than a predetermined amount. If it is not in handoff, at step 602, the mobile terminal follows acknowledgment feedback from its one serving base station. If it is in handoff, (and if the optional determination of average path losses indicates that such average path losses differ from each other by less then the predetermined amount), then, at step 603, the mobile terminal monitors acknowledgments from all the base stations in its active set. At step 604, a determination is made whether any of the base-station responses to a packet transmission is a NACK. If not, at step 605, the mobile terminal prepares to transmit the next data packet. If, however, at step 604, it does receive a NACK from one or more base stations in its active set, the mobile terminal may retransmit the packet. If, at step 606, the retransmission limit has not been reached for this packet, then, at step 607, the mobile terminal retransmits the data packet. If, however, at step 606 the retransmission limit has been reached for this packet, then, at step 608, retransmission for subsequent packets is performed based on an or-of-the-ACKS rule wherein the packet is not retransmitted if an ACK is received from any base station in the active set. Alternatively, but not shown, if the retransmission limit has been reached, retransmission for subsequent packets may be based on the ACK/NACK acknowledgments received only from the serving base station.

In each of the embodiments described above, the mobile terminal may perform a test to determine the reliability of the ACKS or NACKS, or power control bits that it receives from the base stations in its active set in order to determine whether or not to raise its transmit power or to retransmit a packet. Specifically, the received power of the received ACKS/

NACKS or power control bits can be compared against a threshold. In those systems in which ACKS and NACKS are both positively transmitted, then if the power is greater than the threshold, then the received ACKS/NACKS or power control bits can be assumed to be reliable and used to make the appropriate determination of increasing/decreasing the transmit power or retransmitting the packet. On the other hand, if the power is below the threshold, a decision to increase the power or retransmit the packet is made only on the basis of those ACKS/NACKS or power control bits that are deemed to be reliable. For those systems in which a NACK is indicated by base station silence, a NACK would be deemed to be reliable if its power was below a threshold.

Upon a successful decoding of a mobile station's data transmission, the received signal from the mobile terminal is reconstructed and subtracted off from the composite received signal prior to decoding other mobile terminal's transmissions with a concomitant improved signal-to-noise ratio for these other mobile terminals' transmissions. For mobile terminals that have adopted the fallback position for power control or ACK/NACK feedback, the amount of interference presented to the non-serving base stations is likely to be decreased and the penalty due to not being able to successfully decode those transmissions is reduced.

As previously discussed, the described methodology can be used in any system where out-of-cell interference limits the signal-to-noise ratio for one or more in-cell mobile terminals. Examples of such system include a system employing successive interference cancellation or an OFDMA system that allows only one in-cell transmission over a given set of frequency tones.

The above-described embodiment is illustrative of the principles of the present invention. Those skilled in the art can devise other embodiments without departing from the spirit and scope of the present invention.

The invention claimed is:

1. A method for interference management in a wireless communication system, the method comprising:
   at a mobile terminal in handoff status, sending data packets to a plurality of base stations in the mobile terminal's active set of base stations, the active set including a serving base station and at least one non-serving base station; and
   in response to receiving a command to increase the transmit power from any of the base stations in the active set, increasing the mobile terminal's transmit power, unless the transmit power is at its maximum power or the transmit power exceeds a power targeted by the serving base station by a predetermined amount, and
   further in response to receiving the command to increase the transmit power, and the transmit power is at its maximum or above a threshold targeted by the serving base station, reverting to an or-of-the-downs rule for which the mobile terminal lowers its transmit power in the event that it receives a command to do so from any of the base stations in the active set.

2. The method of claim 1 wherein the mobile terminal's transmit power is increased by a predetermined up-step.

3. The method of claim 1 wherein if the transmit power is at its maximum power or if the transmit power exceeds a power targeted by the serving base station by a predetermined amount, and the mobile terminal receives a command to increase its transmit power from any of the base stations in the active set, then controlling the transmit power up or down only in response to commands received from the serving base station.

4. The method of claim 1 further comprising determining the reliability of a received command to increase the transmit power, and increasing the transmit power only if the received command is determined to be reliable.

5. The method of claim 4 wherein the command to increase the transmit power is determined to be reliable if a power of the received command to increase the power is greater than a predetermined threshold.

6. A method for interference management in a wireless communication system comprising:
   at a mobile terminal in handoff status, sending data packets to a plurality of base stations in its active set of base stations, the active set including a serving base station and at least one non-serving base station; and
   in response to receiving from any of the base stations in the active set, at the end of a given packet's retransmission limit, a negative acknowledgment (NACK) of a successful decoding of the packet, increasing the mobile terminal's transmit power unless the transmit power is at its maximum power or the transmit power exceeds a power targeted by the serving base station by a predetermined amount; and
   further in response to receiving the command to increase the transmit power, and the transmit power is at its maximum or above a threshold targeted by the serving base station, reverting to an or-of-the-ACKS power control for which the mobile terminal increases its transmit power only in the event that it doesn't receive a positive acknowledgment of a successful decoding (ACK) from at least one of the base stations in the active set.

7. The method of claim 6 wherein the mobile terminal's transmit power is increased by a predetermined up-step.

8. The method of claim 6 wherein if the transmit power is at its maximum power or if the transmit power exceeds a power targeted by the serving base station by a predetermined amount, and the mobile terminal receives a command to increase its transmit power from any of the base stations in the active set, then for a subsequent data transmission the mobile terminal increases its transmit power only if it receives a NACK from the serving base station and decreases its transmit power if it receives an ACK from the serving base station.

9. The method of claim 6 further comprising determining the reliability of a received NACK from any of the base stations in the active set, and increasing the transmit power only if the received NACK is determined to be reliable.

10. The method of claim 6 wherein the NACK is determined to be reliable by comparing a power of the received NACK with a predetermined threshold.

* * * * *